No. 890,786. PATENTED JUNE 16, 1908.
F. MÜLLER.
CHUCK.
APPLICATION FILED JUNE 21, 1907.

Witnesses:
Otto König
August Heller

Inventor:
Friedrich Müller

UNITED STATES PATENT OFFICE.

FRIEDRICH MÜLLER, OF PADERBORN, GERMANY.

CHUCK.

No. 890,786.  Specification of Letters Patent.  Patented June 16, 1908.

Application filed June 21, 1907. Serial No. 380,099.

*To all whom it may concern:*

Be it known that I, FRIEDRICH MÜLLER, of Paderborn, Prussia, Germany, have invented a certain new and useful Improvement in Chucks, of which the following is a specification.

The purpose of the present invention is to provide a chuck for use in boring or drilling machines lathes and the like which can be constructed to have a large range of capacity for holding tools or work of different diameters, and which enables the tool or work to be removed and automatically gripped while the machine is running.

Figure 1:
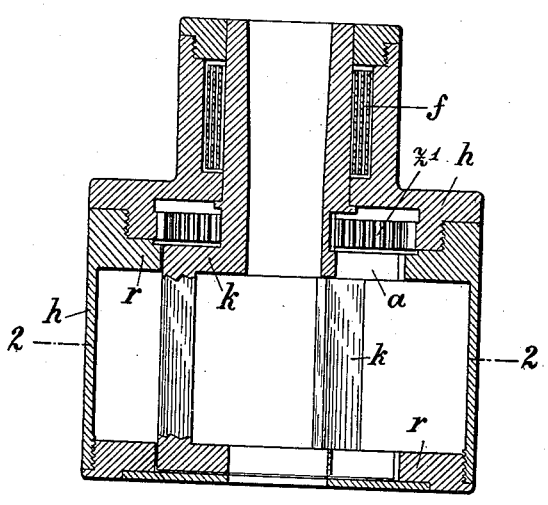
Figure 3:
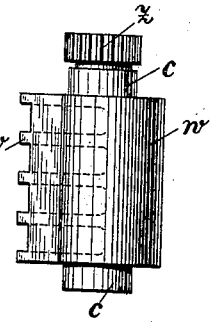
Figure 2:
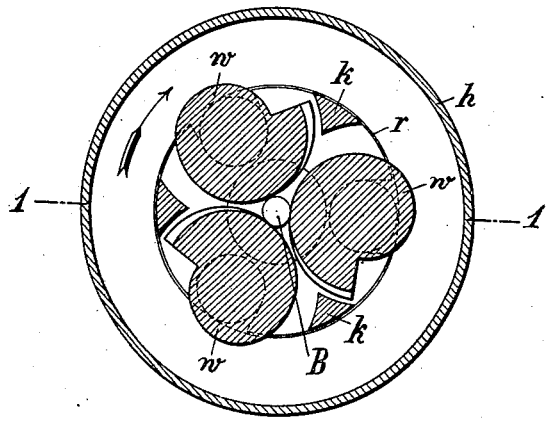
Figure 4:

In the annexed drawing Figure 1 is a vertical section of the chuck on line 1—1 of Fig. 2, the gripping rolls being omitted. Fig. 2 is a horizontal section on line 2—2 Fig. 1 showing also the gripping rolls. Fig. 3 is a side elevation and Fig. 4 is a plan view of one of the gripping rolls.

The chuck comprises three main parts. One of these is the chuck body $k$ (Figs. 1 and 2), which has at one end a coned aperture or socket for the mandrel of the machine, and at the other end an aperture for the passage of the work or tool B. In each of the circular covers of the part $k$ three recesses $a$ are provided to form bearings for rolls $w$ (Figs. 2 and 3).

Another of the main parts of the chuck is the box $h$ (Figs. 1 and 2), which incloses the chuck-body $k$ and is rotatable relatively thereto. The box $h$ has two internal, annular flanges $r$ (Figs. 1 and 2), on which roll the cylindrical parts $c$ of the rolls $w$. The box $h$ also contains an internally toothed ring $z^1$, the teeth of which engage pinions $z$ fixed to the upper ends of the rolls $w$, so that by rotating the box $h$ the rolls can be caused to revolve in order to grip the work or tool B between their surfaces.

The three rolls $w$ (Fig. 3), which constitute the third main element of the chuck, have spiral surfaces (Fig. 2) adapted to abut against the work or tool, and their cylindrical parts $c$ fit into the recesses $a$ with which the part $k$ is provided, and roll on the cylindrical surfaces $r$.

The neck of the box $h$ has an internal annular recess containing a spring $f$ (Fig. 1) which tends to rotate the box $h$ and toothed ring $z^1$ relatively to the part $k$ in the direction indicated in Fig. 2 by the arrow, so that the spiral surfaces of the rolls $w$ are caused by the action of the toothed ring and pinions to converge towards the center of the box and grip the tool or work B (Fig. 2), while the cylindrical journals $c$ of the rolls roll on the annular surfaces $r$ of the box. The mandrel and part $k$ are also rotated in the direction indicated by the arrow. The friction between the tool and the work, which tends to prevent the rotation of the object B gripped, has the effect of rotating the rolls in the direction in which they are rotated by the spring $f$, so that the spiral surfaces converge still more closely, the gripping action being thus increased.

For removing the object B the box $h$ is held fast while the machine continues to run, and the reversal of the action described then causes the rolls to release the object B.

The spiral surfaces of the rolls may be ribbed towards their outlying ends as shown at $v$.

What I claim as my invention and desire to secure by Letters Patent of the United States is:—

In an automatic chuck the combination of a frame $k$ having recesses $a$, rolls having spiral gripping surfaces and journals $c$ at each end thereof, the journals at one end having bearing in the recesses $a$, and an inclosing box rotatable on the frame $k$ and having annular surfaces $r$ on which roll the journals $c$ at the inner and outer ends of the rolls for the purpose set forth.

In witness whereof I have signed this specification in the presence of two witnesses.

FRIEDRICH MÜLLER. [L. S.]

Witnesses:
 OTTO KÖNIG,
 AUGUST HELLER.